(12) United States Patent
Yoshida et al.

(10) Patent No.: US 7,615,108 B2
(45) Date of Patent: Nov. 10, 2009

(54) CANISTER

(75) Inventors: Hiroyuki Yoshida, Saitama (JP); Koji Yamazaki, Saitama (JP); Koichi Hidano, Saitama (JP); Shoichiro Kumagai, Saitama (JP); Takahiro Imamura, Saitama (JP)

(73) Assignees: Mahle Filter Systems Japan Corp., Tokyo (JP); Honda Motor Co., Ltd., Tokyo (JP)

( * ) Notice: Subject to any disclaimer, the term of this patent is extended or adjusted under 35 U.S.C. 154(b) by 254 days.

(21) Appl. No.: 11/861,754

(22) Filed: Sep. 26, 2007

(65) Prior Publication Data

US 2008/0302245 A1 Dec. 11, 2008

(30) Foreign Application Priority Data

Jun. 11, 2007 (JP) ............................. 2007-153482

(51) Int. Cl.
*B01D 53/04* (2006.01)
*F02M 33/02* (2006.01)
(52) U.S. Cl. ........................................ 96/108; 123/519
(58) Field of Classification Search ................ 96/108, 96/147, 153; 123/518–520
See application file for complete search history.

(56) References Cited

U.S. PATENT DOCUMENTS 4,869,739 A 9/1989 Kanome et al.

| | | | |
|---|---|---|---|
| 5,861,050 A * | 1/1999 | Pittel et al. ..................... 95/115 |
| 2001/0015134 A1 | 8/2001 | Uchino et al. |
| 2005/0188851 A1* | 9/2005 | Yamazaki et al. ............. 96/153 |
| 2005/0247202 A1 | 11/2005 | Seki |
| 2006/0196480 A1* | 9/2006 | Kosugi et al. ................ 123/516 |
| 2008/0028939 A1* | 2/2008 | Kido et al. ..................... 96/147 |
| 2008/0184973 A1* | 8/2008 | Yamazaki et al. ........... 123/519 |

FOREIGN PATENT DOCUMENTS

| JP | 62-38468 | 3/1987 |
|---|---|---|
| JP | 64-36962 | 2/1989 |
| JP | 10-339218 | 12/1998 |
| JP | 2001-145832 | 5/2001 |
| JP | 2001-248504 | 9/2001 |
| JP | 2003-311118 | 11/2003 |
| JP | 2005-233106 | 9/2005 |
| JP | 2006-207485 | 8/2006 |

* cited by examiner

*Primary Examiner*—Frank M Lawrence
(74) *Attorney, Agent, or Firm*—Rankin, Hill & Clark LLP

(57) ABSTRACT

A canister includes a casing made of a material including a polyamide resin. The casing includes a charge port to let in fuel vapor, a purge port to let out desorbed fuel and an atmospheric air port to let in air. Granular adsorbing agent and granular heat storing agent are held in the casing. The adsorbing agent includes a granular activated carbon. The granular heat storing agent is mixed with the granular activated carbon in the casing, and the granular heat storing agent including the material of the casing.

8 Claims, 2 Drawing Sheets

CANISTER

BACKGROUND OF THE INVENTION

The present invention relates to a canister which can be used as a fuel vapor processing device for trapping fuel evaporated from a fuel tank of a motor vehicle, and burning the trapped fuel in an internal combustion engine at the time of operation.

As is well known, a canister is used as a fuel vapor treatment device or evaporative emission control device for restraining emission of fuel vapor, such as gasoline vapor, generated in a fuel tank in the stop state of a vehicle, for example. The canister is arranged to trap or adsorb fuel vapor with an adsorbing material or adsorbent such as activated carbon, and to purge or release the trapped fuel with a stream of fresh air introduced from an air port, to supply the fuel component into an intake passage of an engine for combustion disposal in the engine during operation of the engine. By this purge operation to release the adsorbed fuel vapor, the activated carbon can regain the power of adsorption and repeat operation of adsorbing fuel vapor.

In such a canister using activated carbon, the temperature in the canister becomes higher because of exothermic reaction, and the resulting temperature increase tends to deteriorate the adsorbing performance. In the case of desorption of fuel component, on the other hand, the reaction is endothermic. Therefore, the temperature of the canister becomes lower and the desorbing performance tends to become poorer.

To meet this problem, a patent document 1 (JP 62-38468 U) proposes a canister utilizing granular polymer or substance made of giant molecules, mixed with granular activated carbon. A patent document 2 (JP 64-36962 A) proposes activated carbon particles containing heat accumulating solid fillers having a specific heat greater than that of the activated carbon. A patent document 3 (JP 10-339218 A) and a patent document 4 (JP 2006-207485 A) propose the use of heat accumulating particles having higher heat conductivity and greater heat capacity, attached to the surfaces of activated carbon. A patent document 5 (JP2005-233106A) proposes a mixture of particles of adsorbing material and particles of heat storing or accumulating material molded by adding a binder to powder of micro capsules encapsulating a phase-change material for absorbing and releasing latent heat in dependence on temperature change.

SUMMARY OF THE INVENTION

However, in the canister disclosed in the patent document 1 in which the granular activated carbon and granular polymeric substance are filled in a metallic case, the granular activated carbon and polymeric substance rub against the case, and wear down because of vibrations of a vehicle, and thus-produced abrasion powder increases the gas flow resistance. Moreover, the durability of the canister is decreased by the abrasion of activated carbon, and the recyclability of the canister at the time of vehicle disposal is poor because of the combination of three different materials of the case, activated carbon and polymeric substance.

When a metallic material such as iron, stainless steel, copper, and lead is used as solid heat accumulating material as proposed by the patent document 2, the specific gravity of the solid heat accumulating material is greater than that of activated carbon. Therefore, the activated carbon wears away by vibrations, and the abrasion of activated carbon tends to increase the flow resistance in the canister, and shorten the service life of the canister. Besides, corrosion of the metallic solid heat accumulating material could decrease the durability.

In the case of technique of mixing or attaching a heat storing material to activated carbon as proposed in the patent documents 3 and 4, the increase of production steps incurs an increase of the production cost.

The technique of micro capsules encapsulating the phase-change material as disclosed in the patent document 5 also increases the production cost with an increase in production steps. Moreover, the structure of the micro capsule imposes considerable limitation on the operation temperature (the phase change temperature) to absorb and release the adsorption heat, resulting in limitation on the power of the canister, and entails a possibility of leakage of the phase-change material resulting in decrease of the durability.

It is therefore an object of the present invention to provide technique to meet these problems. Specifically, an object of the present invention is to provide a canister adequate for avoiding an increase of the production cost and improving the durability of the canister.

According to one aspect of the present invention, a canister comprises: a casing made of a material including a polyamide resin, including a charge port to let in fuel vapor, a purge port to let out desorbed fuel, and an atmospheric air port to let in air; a granular adsorbing agent including a granular activated carbon held in the casing; and a granular heat storing agent mixed with the granular activated carbon in the casing, the granular heat storing agent including the material of the casing.

DETAILED DESCRIPTION OF THE INVENTION

Figure 1:
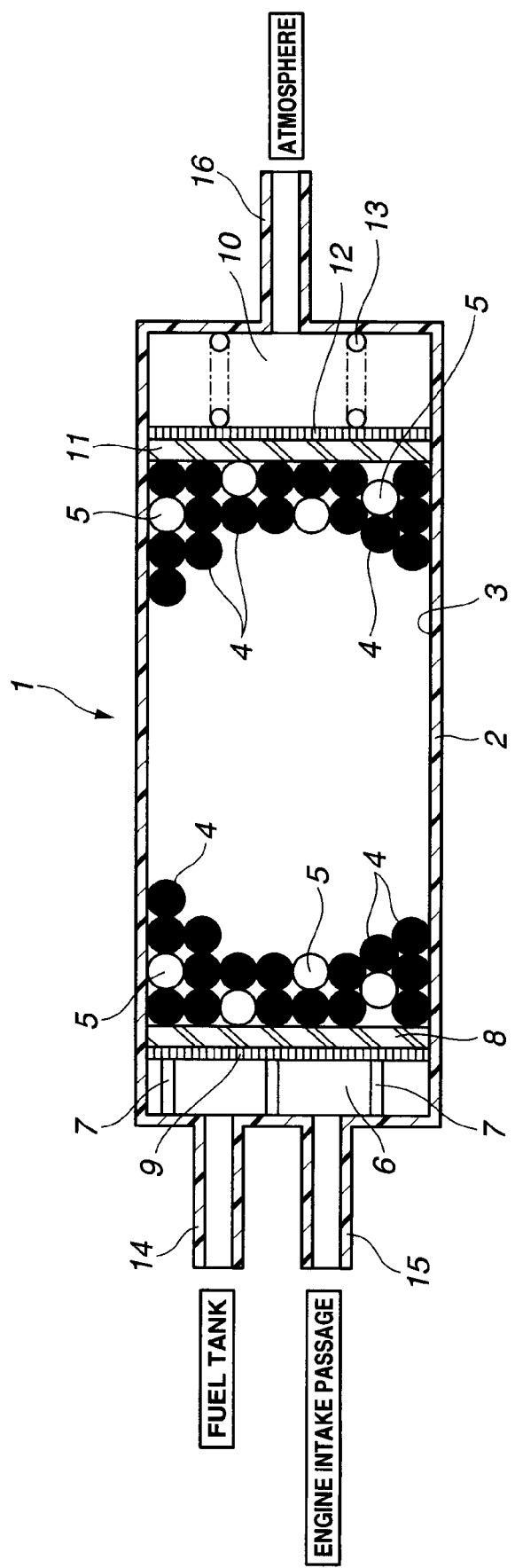
FIG. 1 is a schematic sectional view showing a canister of a first practical example according to one embodiment of the present invention.

According to one embodiment of the present invention, a canister includes at least: a casing, a granular adsorbing agent, and a granular heat storing or accumulating agent. The granular adsorbing agent and heat storing agent are contained in the casing. The casing includes a charge port to let in fuel vapor, a purge port to let out desorbed fuel, and an atmospheric air port to let in air. The casing is made of a material including polyamide resin. The granular adsorbing agent includes granular activated carbon. The granular heat storing agent is made of the material of the casing, as macromolecular material having a greater specific heat.

Thermoplastic polyamide resin (PA) used as the material of the casing and the material of the heat storing agent is superior in chemical resistance, specifically in resistance to gasoline, and heat resistance among various resins. Moreover, polyamide resin is good in terms resistance to water and water absorbing property. Examples of the polyamide resins which can be used in the embodiment are: PA6-6 (registered trade mark: nylon 6-6), PA6 (registered trade mark: nylon 6), PA6-10 (registered trade mark: nylon 6-10), PA11 (registered trade mark: nylon 11), and PA12 (registered trade mark: nylon 12). In view of the function of the heat storing agent, it is preferable to employ a polyamide resin having a specific heat as high as possible. For example, it is preferable to employ a polyamide resin such as PA6-6, PA6 or PA12, having a specific heat in the range of 1.30~1.70 kJ/kg·K.

The casing can be formed by plasticizing a polyamide resin in the form of pellets available as general purpose polyamide resin for injection molding, and forming the plasticized polyamide resin into a predetermined shape. On the other hand, it is possible to use, as the heat storing agent, the commonly available general purpose polyamide resin in the form of pellets for injection molding, directly without an operation of plasticizing and without any modification.

Preferably, both the activated carbon and the heat storing agent are in the form of pellets in order to reduce the gas flow resistance in the canister as much as possible. Preferably, the pellets of the activated carbon and heat storing agent are shaped like a cylinder having a diameter and a length longer than or equal to the diameter. Preferably, the diameter of the heat storing agent may be equal to or slightly shorter than the diameter of the activated carbon. When, for example, the diameter of the activated carbon is about 2 mm, then the diameter of the heat storing agent is about 1.5 mm.

The quantity of the heat storing agent mixed with the activated carbon is determined in consideration of restraint of the gas flow resistance in the canister, the adsorbing power of the canister, and prevention of uneven distribution of the heat storing agent in the activated carbon pellets. For example, the volume percent of the heat storing agent mixed with the activated carbon is in the range of 10~30 vol %.

Since the adsorption of fuel vapor is exothermic reaction, the temperature in the canister tends to become higher, and the temperature increase tends to deteriorate the adsorbing performance. In the case of desorption of adsorbed fuel component, on the other hand, the reaction is endothermic, and the temperature becomes lower so that the desorbing performance tends to become poorer.

Therefore, the activated carbon generates heat at the time of adsorption. However, the generated heat is transferred to the heat storing agent mixed with the activated carbon, and the heat storing aging having a high specific heat can restrain the heat generation of the activated carbon up to the heat capacity of the heat storing agent. In the case of desorption of fuel component, the temperature of the activated carbon becomes lower because of the endothermic reaction. However, the heat storing agent acts to transfer the absorbed heat to the activated carbon and thereby to restrain the temperature decrease of the activated carbon.

According to the embodiment of the present invention, temperature change is restrained merely by mixing the granular heat storing agent of polyamide resin with the granular activated carbon loaded or filled in a casing of polyamide resin. Therefore, the canister according to this embodiment is advantageous in cost, and superior in recyclability because of the sameness between the material of the casing and the material of the heat storing agent. Moreover, the canister according to the embodiment can prevent an increase of the flow resistance by restraining abrasion of the heat storing agent and activated carbon, and improve the durability of the canister. Furthermore, the canister according to the embodiment can provide the following advantages.

(a) The canister according to the embodiment is free from corrosion of the heat storing agent and undesired leakage of a specific substance (such as a phase-change material), so that the durability can be improved significantly as compared to canisters of earlier technology. (b) The canister according to the embodiment can mitigate the range of temperature change caused by absorption and desorption of the activated carbon, and ensure the effect of the canister in a wide range of ambient temperature. (c) The canister according to the embodiment can improve the adsorbing performance without increasing the quantity of the adsorbing material, and increase the adsorbing capacity because of the simple structure in which the heat storing agent is merely mixed with the granular activated carbon without the need for a binder.

FIG. 1 schematically shows a canister 1 in a first practical example according to the embodiment of the present invention.

As shown in FIG. 1, the canister 1 includes a casing 2 of a polyamide resin material typified by PA6-6, PA6 and PA12. The casing 2 is a molded casing of a sealed type, and includes an adsorbing chamber 3 holding an adsorbing agent or material 4. The adsorbing agent 4 of this example is a granular activated carbon (shown by small black circles in FIG. 1). The granular activated carbon 4 is mixed with a granular heat storing agent or material 5 (shown by small white circles in FIG. 1) having a relatively large specific heat, at a predetermined mixture ratio. The granular heat storing agent 5 is in the form of particles made of the same material as the casing 2. The adsorbing chamber 3 is filled with the mixture of granular activated carbon 4 and granular heat storing agent 5.

The casing 2 includes a first end formed with a charge port 14 and a purge port 15, and a second end formed with an atmospheric air port 16. A first hollow portion 6 is formed, between the first end of casing 2 and a first partition (serving as a fixed partition) composed of a permeable screen 8 of a permeable material such as urethane or nonwoven fabric, and a grid 9, by inside support portions or embossed portions 7 projecting from the first end of casing 2 and abutting against the first partition. A second hollow portion 10 is formed, between the second end of casing 2 and a second partition (serving as a movable partition) composed of a permeable screen 11 of a permeable material such as urethane or nonwoven fabric, and a grid 12. The granular activated carbon 4 and granular heat storing agent 5 are filled in the mixed state in the adsorbing chamber 3 defined between the first and second partitions. A compression coil spring 13 is disposed in the second hollow portion 10 between the second end of casing 2 and the second partition, and arranged to urge the second partition in a direction (leftward as viewed in FIG. 1) toward the first partition, that is, a direction to decrease the volume of adsorbing chamber 3.

Thus, the structure of the coil spring 13 (serving as an urging member) and the second partition (serving as the movable partition) can resiliently hold the granular activated carbon 4 and the granular heat storing agent 5 in a packed or pressurized state to prevent undesired rattling motion of the granular activated carbon 4 and granular heat storing agent 5 in the chamber 3.

The casing 2 of the polyamide resin can be formed by joining two separate members together. In this example, the sealed up casing 2 is formed by joining a casing main body of the polyamide resin and a cover of the polyamide resin together by welding after the screens 8 and 11, the grids 9 and 12, the coil spring 13, and the mixture of the granular activated carbon 4 and granular heat storing agent 5 are installed and filled in the casing main body.

The charge port 14 and purge port 15 are formed integrally in the first end of casing 2. Charge port 14 is adapted to be connected with a fuel tank and to receive fuel vapor from the fuel tank. The purge port 15 is adapted to be connected with an intake side of an internal combustion engine, and to supply fuel desorbed from the activated carbon 4 by introduction of atmospheric air into the canister 1. The atmospheric air port 16 is formed integrally in the second end of casing 2 opposite to the first end. The atmospheric air port 16 is arranged to open to the outside and to let in outside air from the outside. These ports 14, 15 and 16 are integral parts of the casing 2 of the polyamide resin.

It is possible to determine the sizes of the granular activated carbon 4 and granular heat storing agent 5, and the quantity or percentage of the granular heat storing agent 5 with respect to the quantity of the granular activated carbon 4, so as to secure the adsorbing performance of the canister 1, and to prevent the granular heat storing agent from being distributed unevenly in the granular activated carbon by vibrations of the vehicle. In this example, the granular adsorbing agent 4 is in the form of pellets (shaped like a solid cylinder). For example, particles of adsorbing agent 4 are formed in the shape of a cylindrical pellet having a diameter (which is equal to 2 mm in this example) and a length equal to or greater than the diameter. The particle size of the high-specific-heat granular heat storing agent 5 is approximately equal to that of the granular activated carbon 2. In this example, the granular heat storing agent 5 is in the form of pellets (shaped like a solid cylinder like the granular activated carbon 4). For example, particles of granular heat storing agent 5 are formed in the shape of a cylindrical pellet having a diameter (which is equal to 1.5 mm in this example) and a length equal to or greater than the diameter (1.5 mm). In this example, the quantity of the granular heat storing agent 5 with respect to the activated carbon 4 is in the range of 10~30 vol % in order to secure a sufficient specific heat.

As mentioned before, the pellets of the heat storing agent 5 are made of the same material as the casing 1. That is, the granular heat storing agent 5 is in the form of pellets of a polyamide resin which is one of thermoplastic resins. In this example, when PA-66 is employed as the material of casing 2, then the PA-66 resin is used as the material of the heat storing agent 5. Although casing 2 is formed by plasticizing a polyamide resin in the form of pellets available as general purpose polyamide resin for injection molding, and forming the plasticized polyamide resin into a predetermined shape, it is possible to use, as the granular heat storing agent 5, the commonly available general purpose polyamide resin in the form of pellets for injection molding, directly in the original form of pellets without the need for a forming operation to the advantage of the cost.

According to this embodiment, it is possible to select any one or two of various polyamide resins as the materials of casing 2 and granular heat storing agent 5. For example, instead of PA-66, it is possible to employ PA6 or PA12. Moreover, it is possible to employ PA6-10 or PA11. The material of the granular heat storing agent 5 may be a first one of the polyamide resins whereas the material of casing 2 is a second one of the polyamide resins different from the first one.

The thus-constructed canister takes in fuel vapor generated in the fuel tank in a stop state of the vehicle, through charge port 14, and adsorbs the fuel vapor with the granular activated carbon 4.

When the engine is in operation, intake air is inducted through canister 1, and hence atmospheric air is introduced from atmospheric air port 16 into canister 1, and supplied through purge port 15 to the intake system of the engine. The thus-formed stream of air through canister 1 acts to purge the granular activated carbon 4 and to convey the fuel component desorbed from the activated carbon 4 into the engine to dispose of the fuel component by combustion in the engine. By this purge operation to desorb fuel, the granular activated carbon 4 regains the ability to absorb fuel vapor. The mechanism of adsorption and desorption per se is basically the same as in a conventional canister.

As mentioned before, the progress of exothermic adsorption of fuel vapor by the activated carbon 4 tends to increase the temperature of the activated carbon 4 and hence to decrease the adsorbing ability of activated carbon 4. On the other hand, the endothermic desorption tends to decrease the temperature of the activated carbon 4 and hence to decrease the desorbing ability of activated carbon 4.

In the canister 1 of this example, however, heat generated by the adsorption is transferred to the granular heat storing agent 5 mixed with the granular activated carbon 4; and the heat is absorbed by the granular heat storing agent 5 having the high specific heat, up to its heat capacity. Thus, the heat storing agent 5 functions to restrain a temperature increase of the activated carbon 4.

Similarly, in the case of desorption of adsorbed fuel component from the activated carbon 4, the heat storing agent 5 functions to restrain a temperature decrease of the activated carbon 4 by transferring the heat stored in the heat storing agent 5 to the activated carbon 4.

In this practical example, the pellet activated carbon 4 is mixed with the pellet heat storing agent 5 of the same material as the casing 2. By preventing excessive heat generation by the adsorption of fuel vapor, and preventing excessive temperature decrease of the activated carbon 4 by the desorption, the pellet heat storing agent 5 can protect the adsorbing ability and the desorbing ability of the activated carbon stably for a long time.

The polyamide resin is used for both the material of casing 2 and the material of heat storing agent 5. Therefore, coil spring 13 is only one metallic component of the canister 1. Therefore, this canister 1 is advantageous in the recyclability at the end of service life of a vehicle. Moreover, the canister 1 of this example is advantageous in restraining abrasion of the heat storing agent 5 and adsorbing agent 4 as compared to a canister having a metallic casing and/or a metallic heat storing agent; and thereby restraining an increase of the flow resistance of canister 1.

This canister 1 can provide intended performance in a wide range of ambient temperature by restraining undesired temperature changes of the activated carbon due to adsorption and desorption. Furthermore, the canister 1 can improve the adsorbing performance without increasing the quantity of adsorbing agent as compared to a conventional canister. Moreover, the canister 1 can increase the adsorbing quantity in a predetermined volume because of the simple structure in which the pellet heat storing agent is merely mixed with the pellet activated carbon without the need for a binder.

Even if moisture is mixed in fuel vapor, the heat storing agent 5 of the polyamide resin does not suffer corrosion, deterioration or other adverse influence of moisture.

In the first practical example, the heat storing agent 5 is in the form of pellets. However, it is possible to use various forms of the heat storing agent 5. For example, it is possible to utilize chips produced at the time of injection molding of the polyamide resin. In this case, chips are broken into particles of adequate sizes comparable to the size of adsorbing agent 4, and the particles are mixed with pellets of the heat storing agent 5.

Figure 2:
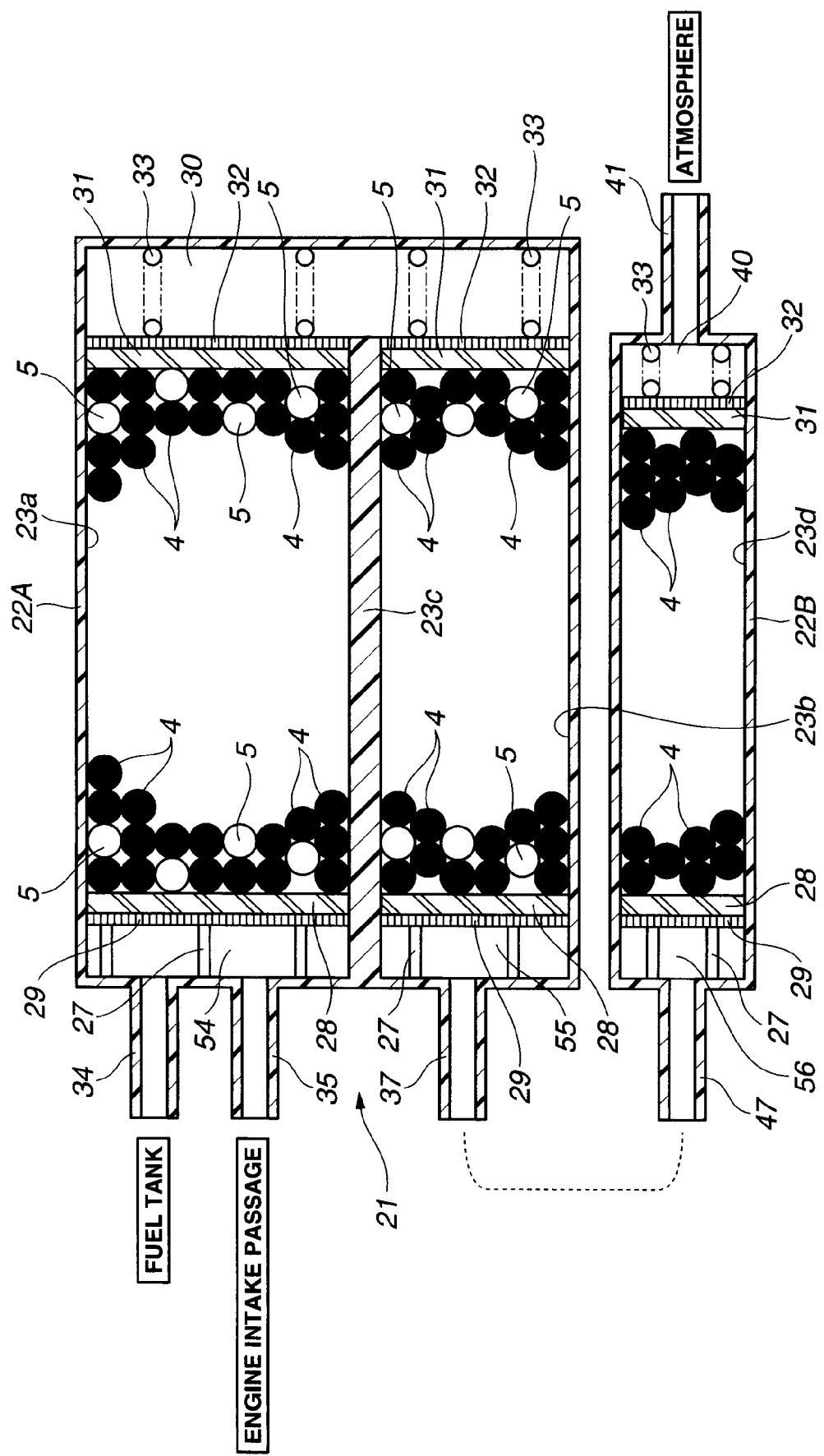
FIG. 2 is a schematic sectional view showing a canister of a second practical example according to the embodiment of the present invention.

FIG. 2 schematically shows a canister 21 in a second practical example of the embodiment. A casing of canister 21 is composed of a first casing 22A having a two-chamber, U turn flow structure, and a second casing 22B serving as a third adsorbing chamber 23*d*. The same reference numerals are used for parts substantially identical to the corresponding parts of the canister 1 shown in FIG. 1.

As shown in FIG. 2, the first casing 22A includes first and second adsorbing chambers 23*a* and 23*b* separated by a wall 23c. First and second adsorbing chambers 23a and 23b are main chambers, and each of the first and second adsorbing chambers 23a and 23b is filled with the activated carbon 4 in the form of pellets and the heat storing agent 5 in the form of pellets in the mixed state. A connecting hollow portion 30 connects the first and second adsorbing chambers 23a and 23b so as to form a U-turn gas passage. Two coil springs 33 are disposed in the hollow portion 30 so as to apply urging forces, respectively, to the first and second adsorbing chambers 23a and 23b, like the coil spring 13 shown in FIG. 1. Like the adsorbing chamber 3 of FIG. 1, each of first and second adsorbing chambers 23a and 23b is defined between a first (left) partition composed of a permeable screen 28 and a grid 29 and a second (right) partition composed of a permeable screen 31 and a grid 32. Pellets of activated carbon 4 and pellets of heat adsorbing agent 5 are filled in each adsorbing chamber 23a or 23b between the first and second partitions. The first (left) partition of each of the first and second adsorbing chambers 23a and 23b is supported stationary by inside support (or embossed) portions 27 projecting from the inside surface of an end wall of first casing 22A and abutting against the first (left) partition. The second (right) partition of each of the first and second adsorbing chambers 23a and 23b is urged by the corresponding coil spring 33 toward the first partition as in the canister 1 of FIG. 1. The hollow portion 30 connects the second end of first adsorbing chamber 23a defined by the second (right) partition, with the second end of second adsorbing chamber 23b defined by the second (right) partition on the right side as viewed in FIG. 2.

First casing 22A is integrally formed with a charge port 34 and a purge port 35 which are connected with first adsorbing chamber 23a; and a connection port 37 which is connected with second adsorbing chamber 23b. Charge port 34 is a port to let in fuel vapor from a fuel tank. Purge port 35 is a port to supply fuel component released from the activated carbon 4 in the canister 21 to the intake passage of an internal combustion engine. First casing 22A has first (left) end wall and second (right) end wall between which first and second adsorbing chambers 23a and 23b are formed. Charge port 34, purge port 35 and connection port 37 project from the outside surface of the first (left) end wall of first casing 22A. The second (right) end wall of first casing 22A bounds the hollow portion 30 and supports one end of each coil spring 33. A hollow portion 54 is formed, between the first end wall of casing 22A and the first partition (serving as a fixed partition) for the first adsorbing chamber 23a. A hollow portion 55 is formed, between the first end wall of casing 22A and the first partition (serving as a fixed partition) for the second adsorbing chamber 23b.

Second casing 22B includes therein the single third adsorbing chamber 23d as a secondary chamber. Second casing 22B has first (left) end wall and second (right) end wall between which third adsorbing chamber 23d is formed. Third adsorbing chamber 23d is defined between a first (left) partition composed of a permeable screen 28 and a grid 29 and a second (right) partition composed of a permeable screen 31 and a grid 32. Pellets of activated carbon 4 are filled in third adsorbing chamber 23d between the first and second partitions. The first (left) partition is supported stationary by inside support (or embossed) portions 27 projecting from the inside surface of the first (left side) end wall of second casing 22B and abutting against the first (left) partition. The second (right) partition of third adsorbing chamber 23d is urged toward the first partition, by a coil spring 33 disposed in a hollow portion 40 between the second (right side) end wall of second casing 22B and the second partition of third adsorbing chamber 23d. Unlike the first and second adsorbing chambers 23a and 23b, the third adsorbing chamber 23d is filled only with the adsorbing agent 4, and no heat storing agent 5 is mixed.

Second casing 22B is integrally formed with a connection port 47 projecting from the first (left side) end wall. The connection port 47 of second casing 22B is connected with the connection port 37 of first casing 22A by a tube member which is a hose in this example. Second casing 22B is further formed integrally with an atmospheric air port 41 projecting from the second (right side) end wall of second casing 22B. A hollow portion 56 is formed between the first (left side) end wall of second casing 22B and the first (left side) partition for third adsorbing chamber 23d.

The thus-constructed canister 21 of the second practical example is operated in the following manner. When the vehicle in which this canister 21 is installed is in the stop state, fuel vapor generated in the fuel tank is introduced from charge port 34 through hollow portion 54 into first adsorbing chamber 23a. From first adsorbing chamber 23a, the fuel vapor is further conveyed through the connecting hollow portion 30 into second adsorbing chamber 23b. From second adsorbing chamber 23b, the fuel vapor is further conveyed through the hollow portion 55, the connection ports 37 and 47, and the hollow portion 56, into third adsorbing chamber 23d. During this flow, the fuel vapor is adsorbed by the granular activated carbon 4 in the adsorbing chambers 23a, 23b and 23d.

When the engine is operated, intake air is introduced into the engine through canister 21. Therefore, air flows in a reverse direction from air port 41, through hollow portion 40 into third adsorbing chamber 23d; further into second adsorbing chamber 23b through hollow portion 56, connection ports 47 and 37, and hollow portion 55; and into first adsorbing chamber 23a through connecting hollow portion 30. From the first adsorbing chamber, the air is supplied through hollow portion 54 and purge port 35 into the intake passage of the engine. The reverse flow of air purges the activated carbon 4 in the adsorbing chambers 23d, 23b and 23a by desorbing the fuel component adsorbed by the activated carbon 4, and carries the desorbed fuel into the engine through purge port 35 to allow the fuel to be burned in the engine. By this purging air stream, the activated carbon 4 regains its power to adsorb fuel vapor.

The heat storing agent 5 mixed with the activated carbon 4 transfers heat with the activated carbon 4 in the first and second adsorbing chambers 23a and 23b, as in the first practical example, during the process of adsorption and desorption.

The canister 21 of the second practical example can provide the same effects as the canister 1 of the first practical example. Moreover, the canister 21 of the second practical example having the third adsorbing chamber 23d filled only with the adsorbing agent 4 in addition to the first and second adsorbing chambers 23a and 23b can further improve the charging efficiency and purging efficiency. In the second practical example, first and second casings 22A and 22B are both made of polyamide resin.

In the example shown in FIG. 2, the first and second casings 22A and 22B are separate members connected by the hose between the connection ports 37 and 47. However, it is possible to employ an integral casing in which the first, second and third adsorbing chambers 23a, 23b and 23d are formed. In this case, the second and third adsorbing chambers 23b and 23d can be connected together by connecting the connection ports 37 and 47 directly, or by connecting the hollow portion 55 and hollowing 56 directly.

Furthermore, the first casing 22A shown in FIG. 2 can be used solely as a canister without using the second casing 22B.

In this case, the second casing 22B is eliminated, and the connection port 37 is used as the atmospheric air port.

This application is based on a prior Japanese Patent Application No. 2007-153482 filed on Jun. 11, 2007. The entire contents of this Japanese Patent Application No. 2007-153482 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A canister comprising:
   a casing made of a material including a polyamide resin, including a charge port to let in fuel vapor, a purge port to let out desorbed fuel, and an atmospheric air port to let in air;
   a granular adsorbing agent including a granular activated carbon held in the casing; and
   a granular heat storing agent mixed with the granular activated carbon in the casing, the granular heat storing agent including the material of the casing.

2. The canister as claimed in claim 1, wherein the granular activated carbon and the granular heat storing agent are both in the form of pellets.

3. The canister as claimed in claim 2, wherein the pellets of the granular activated carbon and the granular heat storing agent are formed in a cylindrical shape having a diameter and a length equal to or greater than the diameter.

4. The canister as claimed in claim 3, wherein the heat storing agent is mixed with the activated carbon so that a quantity of the heat storing agent is 10~30 vol % of a total quantity of the activated carbon and the heat storing agent.

5. The canister as claimed in claim 1, wherein the casing is made of one of polyamide 6-6, polyamide 6, polyamide 6-10, polyamide 11 and polyamide 12, and the heat storing agent includes particles of one of the polyamide 6-6, the polyamide 6, the polyamide 6-10, the polyamide 11 and the polyamide 12.

6. The canister as claimed in claim 1, wherein the casing is made of one of polyamide 6-6, polyamide 6 and polyamide 12, and the heat storing agent includes particles of one of the polyamide 6-6, the polyamide 6 and the polyamide 12.

7. A canister comprising:
   a polyamide casing made of a polyamide resin material, and formed with an adsorbing chamber extending from a first end to a second end, a charge port to let in fuel vapor into the adsorbing chamber from the first end, a purge port to let out desorbed fuel from the first end of the adsorbing chamber, and an atmospheric air port to let in air into the adsorbing chamber from the second end of the adsorbing chamber;
   activated carbon pellets of an activated carbon, contained in the adsorbing chamber; and
   polyamide pellets of the polyamide resin material, contained together with the activated carbon pellets in the adsorbing chamber.

8. The canister as claimed in claim 7, wherein the activated carbon pellets and the polyamide pellets are both cylindrical and packed in the adsorbing chamber.

* * * * *